United States Patent [19]
Bakic

[11] Patent Number: 4,793,320
[45] Date of Patent: Dec. 27, 1988

[54] CHARCOAL BURNER

[76] Inventor: Mark C. Bakic, P.O. Box 963, Ewess, Tex. 76039

[21] Appl. No.: 18,920

[22] Filed: Feb. 24, 1987

[51] Int. Cl.[4] .............................................. F24B 3/00
[52] U.S. Cl. .................... 126/25 B; 126/9 A; 44/541
[58] Field of Search ............. 126/9 A, 25 B; 44/35, 44/38, 39, 40, 41; 206/605, 620, 436, 815

[56] References Cited

U.S. PATENT DOCUMENTS

| | | | |
|---|---|---|---|
| 1,401,803 | 12/1921 | Lynes | 126/9 A X |
| 1,959,473 | 5/1934 | Heron | 126/9 A X |
| 2,834,661 | 10/1956 | Chaplin | 126/9 A X |
| 3,028,228 | 4/1962 | Chaplin | 126/25 B X |
| 3,031,277 | 4/1962 | Strauss | 44/40 |
| 3,279,453 | 10/1966 | Norehad et al. | 126/9 A X |
| 3,347,363 | 10/1967 | Dykes et al. | 206/436 |
| 3,374,071 | 3/1968 | Corriher et al. | 44/38 |
| 3,829,006 | 8/1974 | Spiegel | 206/608 |
| 4,460,377 | 7/1984 | Kalil | 44/40 |

FOREIGN PATENT DOCUMENTS

| | | | |
|---|---|---|---|
| 875947 | 7/1971 | Canada | 44/40 |
| 8002847 | 12/1980 | PCT Int'l Appl. | 44/40 |

*Primary Examiner*—Margaret A. Focarino
*Attorney, Agent, or Firm*—Hubbard, Thurman, Turner & Tucker

[57] ABSTRACT

A fuel combustion apparatus. A base member having side walls which extend generally upwardly therefrom to intersect into a cap member form a container for housing charcoal fuel particles. Charcoal fuel particles are stacked in an overlying relationship within the interior chamber of the container. The interior lining of the chamber is treated with paraffin and a mixture of potassium chlorate. The container is ignited at the base to initiate combustion of the charcoal fuel particles therein. The charcoal fuel particles may also be treated with a flammable petroleum product. Vent holes are placed in the cap member to facilitate air flow within the chamber, and also provided a convenient handle for transport and handling of the apparatus. In an alternative embodiment, the cap member may also be removed to permit access to charcoal particles within the container chamber.

21 Claims, 2 Drawing Sheets

CHARCOAL BURNER

BACKGROUND OF THE INVENTION

The present invention relates generally to food preparation fuel products, and more particularly provides a unique combustible container for cooking or barbecuing food.

Recreational outdoor cooking or the so-called backyard "barbecue" is an activity currently of wide spread enjoyment. Consequently, a substantial commercial market has developed for charcoal and petroleum products which feature a variety of aspects of convenience for the consumer. Charcoal is conventionally marketed for such purposes in the form of small briquettes contained within a durable paper bag. The briquettes must be suitably stacked in the bottom of the charcoal grill and then soaked with a flammable liquid to allow for adequate combustion. This process is unusually messy and dangerous. The process of stacking the briquettes will usually cover the user's hands with black soot, while placement of flammable liquid on the briquettes leads to thousands of instances of property damage and dermal burns every year. In order to eliminate some of these undesirable characteristics of outdoor cooking, charcoal briquettes have been marketed in egg carton-like containers which may be placed in the bottom of the charcoal grill and ignited. While this eliminates the mess usually caused by actual manual contact with the briquettes, such containers invariably do not burn well since the charcoal is not stacked in a suitable pile to maximize the heat generated by the coals. Likewise, charcoal briquettes have been marketed which are pre-soaked with a flammable petroleum liquid. This form of charcoal is somewhat dangerous, since it is subject to accidental ignition if the storage bag is left open or subjected to an inordinate amount of heat. Likewise, such self ignitting briquettes are rendered ineffective if they are exposed to a moderate amount of humidity. Self-lighting charcoal which has failed to function can become a potential safety hazard, especially where a disappointed consumer impatiently pours gasoline or other explosive material over the coals in a frustrated attempt to initiate combustion. The hazards associated with the various products available on the market are often unavoidable even with prudent use.

The outdoor cooking fuel products available on the market are notably inefficient and possess shortcomings in the areas described. It is accordingly an object of the present invention to provide an outdoor cooking fuel or charcoal burning package which eliminates or substantially minimizes the above mentioned and other problems and limitations typically associated with outdoor cooking or barbecuing.

SUMMARY OF THE INVENTION

The present invention provides a convenient fuel combustion apparatus which comprises a container having side walls extending generally upward from a base portion, the side walls converging into a cap member. Charcoal fuel particles are placed in a stacked overlying relationship within the interior chamber of the container to conform generally to the interior dimensions of the container. This arrangement is particularly suitable to enhance combustion of the charcoal fuel particles, which normally must be stacked in a pile to generate sufficient heat for proper combustion. The container is ignited with a match or small flame to initiate sustained combustion for cooking.

The container is constructed of a cardboard material, and is treated on its interior surface with a film of paraffin wax and a mixture of potassium chlorate. This permits even burning of the container in a manner to maximize the heat generated to the charcoal fuel particles. The charcoal fuel particles may be treated with a petroleum product to further facilitate combustion.

In a preferred embodiment of the fuel combustion apparatus, the container is shaped in the form of a pyramid having four sides and a base. It is contemplated that the container may also be conical, frusto-conical or multi-sided to accomplish effective arrangement of the charcoal fuel particles within the chamber for proper combustion. The preferred embodiment also includes vent holes which are perforated within the cap member. The vent holes may be opened by applying pressure over the perforated areas to fold the vent flaps inward into the chamber. The vent holes enhance the air flow within the chamber during combustion to facilitate proper burning of the charcoal fuel particles, and also provide a convenient carrying handle for transport and handling of the apparatus.

It is also contemplated that the cap member of the present invention may be removable. A tear open strip may manually be removed, so that the cap may be partially or fully disassembled from the container, so as to permit access to the charcoal fuel particles therein. It is contemplated that in this embodiment, charcoal lighter fluid or other flammable petroleum product may be added just prior to ignition as opposed to have presaturated charcoal within the chamber.

The preferred embodiment of the apparatus also contemplates a unique arrangement of a series of containers into the shape of a cube for storage and shipment. The containers may be placed such that the caps meet and side walls rest against one another such that six containers may be arranged generally into the shape of a cube.

DETAILED DESCRIPTION

Figure 1:
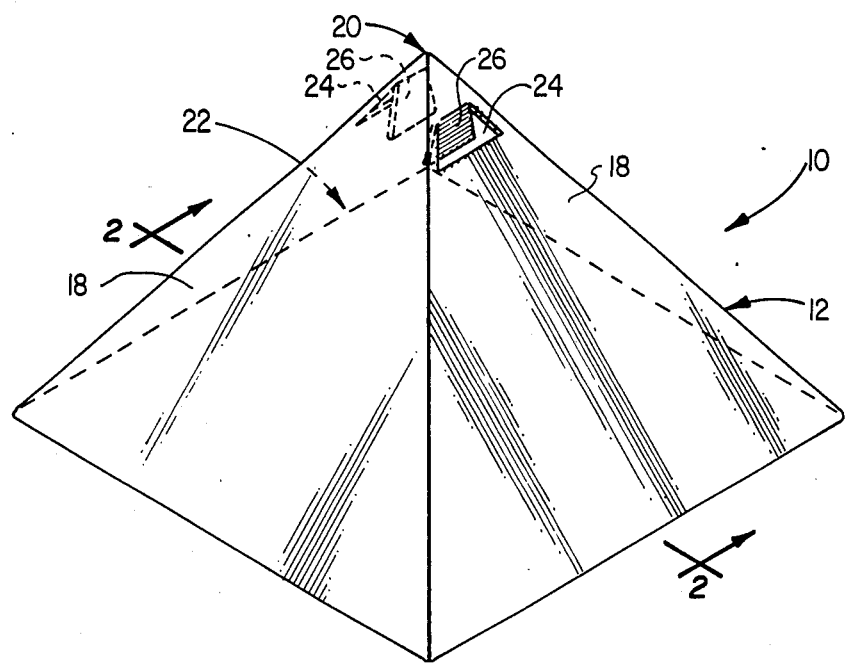
FIG. 1 is an enlarged perspective view of a combustible fuel apparatus which embodies principles of the present invention and is utilized by ignition of the container to cause combustion of the fuel therein for cooking.

Perspectively illustrated in FIG. 1 is a combustible fuel apparatus 10 which embodies principles of the present invention and is utilized by ignition of container 12 to initiate combustion of charcoal fuel particles 14 therein. The fuel combustion apparatus 10 is particularly well adapted for convenient handling, storage and packing and is uniquely constructed to efficiently maximize arrangement of charcoal 14 confined within container 12 for proper heat generation.

Figure 2:
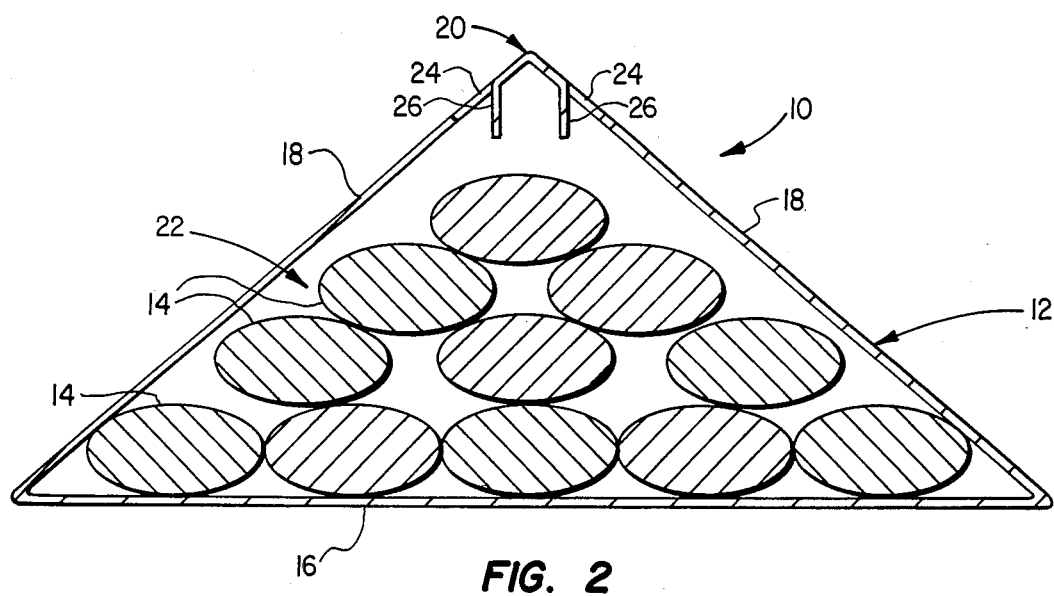
FIG. 2 is an enlarged, elevated cross-sectional view taken along line 2—2 of FIG. 1, and illustrates the overlying, stacked relationship of charcoal fuel particles within the apparatus container as arranged for maximum generation of heat.

Referring now to FIGS. 1 and 2, container 12 comprises a base member 16 having side walls 18 which are formed contiguous therewith and extend generally upwardly therefrom at an angle so as to converge and form a cap 20. The container 12 is preferably constructed of a somewhat rigid cardboard material. It is contemplated, however, that the container may also be formed of a more resilient material such as flexible paper. In the preferred embodiment shown, the base member 16 is generally a square approximately twelve inches in length on each side. Four side walls 18 are formed contiguous with base member 16 and extend upwardly therefrom. Side walls 18 extend upward at an angle of less than 90°, so as to converge into a point to form cap 20. Side walls 18 and base member 16 thereby form a sealed container 12 having an interior chamber 22. Cap 20 is approximately eight inches above base member 16. It is contemplated that the base member 16 may in alternative embodiments be of any particular shape, so as to form container 12 into the shape of a cone, three dimensional triangle, frusto-cone, or any other configuration wherein the side walls converge into an upper cap 20. Cap 20 may be flat in the case of a frusto-pyramidal or frusto-conical container 12.

Figure 3:
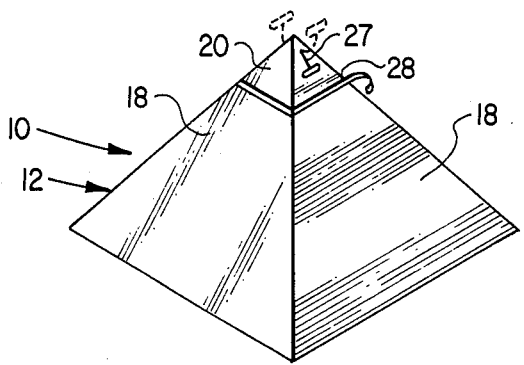
FIG. 3 is a perspective view of the container of the present invention showing a removable cap for access to the interior chamber.

Base member 16 and side walls 18 of container 12 may be constructed of any material of suitable strength which may easily be burned. In the preferred embodiment, 3/16 inch, single-face, fifty pound corrugated paper board is used. The general dimensions of container 12 in the preferred embodiment are twelve inches by twelve inches by eight inches in height, but these dimensions may vary somewhat to meet the needs of the particular application. The interior surface of container 12 is coated with paraffin wax (not shown) in order to seal chamber 22. This protects charcoal particles 14 from humidity which may inhibit combustion, and further eliminates evaporation of any flammable substance with which charcoal particles 14 may be treated. Likewise, the treatment with paraffin wax permits container 12 to burn quickly and evenly so as to maximize combustion of charcoal particles 14 therein. The paraffin wax may also be treated with a mixture of chlorate for enhanced burning. Cap 20 of apparatus 10 further includes vent holes 24. Vent holes 24 may form a perforated portion of cap 20, and may be opened by applying pressure thereto thus forcing flaps 26 into chamber 22. Any suitable aperture arrangement is contemplated for purposes of ventilation of chamber 22 during combustion. Vent holes 24 are opened just prior to ignition of container 12, so as to permit proper air flow within chamber 22 as container 12 burns, thereby facilitating combustion of charcoal particles 14. Likewise, vent holes 24 may serve to provide a convenient carrying handle for apparatus 10. The thumb and index finger of the user may be inserted into vent holes 24 for handling and transport of apparatus 10. It is also contemplated that cap 20 may include additional transport handles 27 (FIG. 3). Handles 27 may be constructed to rest along the surface of cap 20 and bend upward for manual access.

Figure 4:
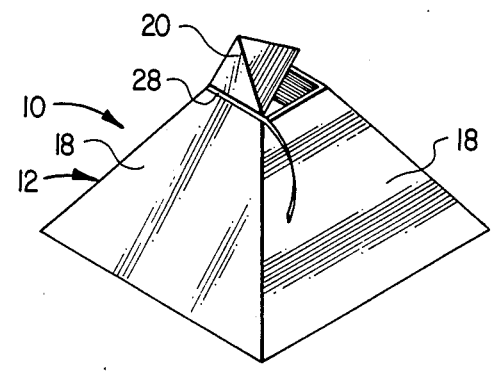
FIG. 4 is a perspective view of the container of the present invention showing the removable cap in a partially opened position.

Referring now to FIGS. 3 and 4, apparatus 10 may also include tear open strip 28. Tear open strip 28 permits the user to partially or fully remove cap 20 from the upper portion of container 12, to permit access to chamber 22. While it is contemplated in the preferred embodiment that charcoal particles 14 may be soaked with some form of flammable liquid to enhance combustion, for safety reasons the charcoal may also be packaged "dry". The user may then access the charcoal by removing tear open strip 28 so as to permit the pouring of charcoal lighter fluid or other petroleum product therein to facilitate combustion of charcoal particles 14.

Figure 5:
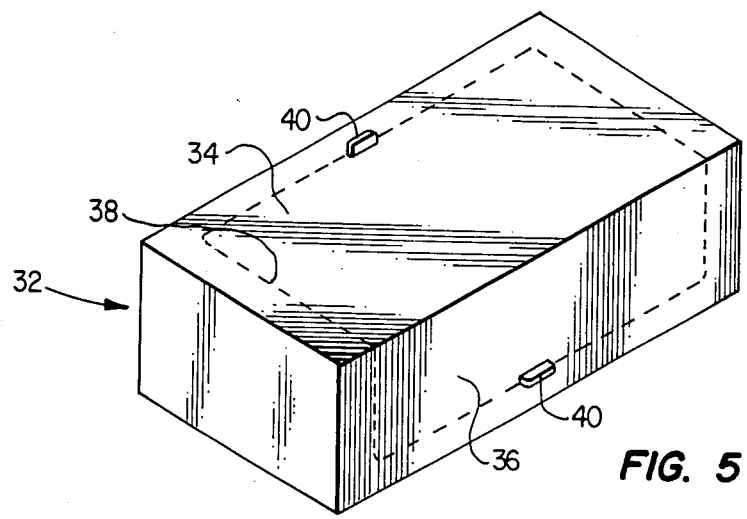
FIG. 5 is a perspective view of an outer container for housing a plurality of the containers for shipping, storage and display.
Figure 6:
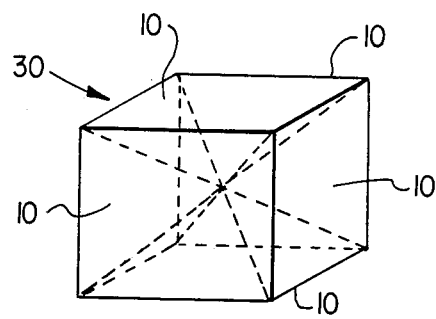
FIG. 6 is a perspective view showing arrangement of a plurality of the containers of the present invention in the form of a cube, which fit within an outer container suitable for storage, display and shipment.
Figure 7:
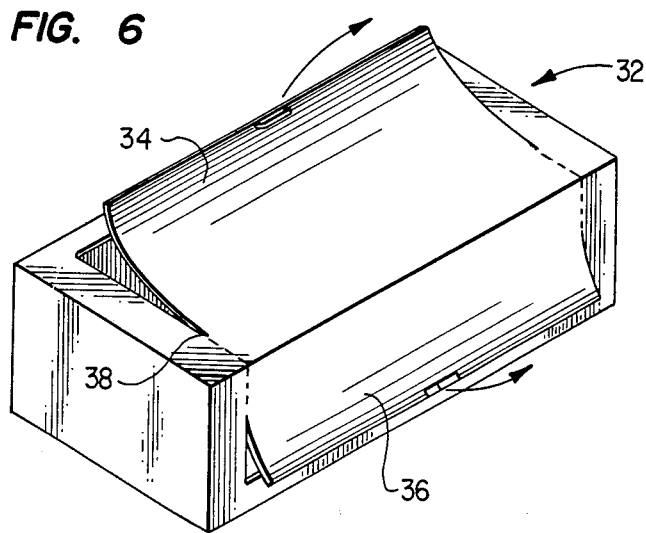
FIG. 7 is a perspective view of the outer container showing disengagement along the perforation line and removal of the front wall and side wall for display of the cube therein.

Referring now to FIGS. 5-7, in a preferred embodiment of apparatus 10 a series of containers 12 may be arranged to form a cube 30. The cap members 20 are positioned such that the base member 16 of each container 12 form an exterior face of the larger cube 30. Thereby, containers 12 may be easily stacked in retail stores, and conveniently packaged in groups of 6 for shipping and storage. A unique outer container 32 may be provided to envelope and contain a plurality of cubes 30 for shipment and display. Outer container 32 includes contiguous top wall portion 34 and front wall portion 36 which are bounded by a continuous perforation line 38. Finger holes 40 are provided along perforation line 38 to permit manual handling of outer container 32. Upon placement of container 32 in for example a store or other retail destination, finger holes 40 may be pulled abruptly to tear away top wall portion 34 and front wall portion 36 along perforation line 38, thereby creating an open display of cubes 30 within container 32.

It can be seen from the foregoing that the present invention provides a combustible apparatus which is of a simple, reliable and safe construction and provides a variety of desirable convenience features. Due to the unique enclosure container 12, the charcoal particles 14 therein are maintained in a stacked relationship designed to maximize heat generation and combustion for proper burning. The container may be placed in a charcoal grill and ignited without the need for manual adjustment of the charcoal fuel particles, thereby keeping the user's hands clean. Likewise, the invention eliminates the need for applying a flammable petroleum liquid to the coals, which substantially reduce the risk of uncontrolled fire and personal injury. The interior facing of the container is coated with a paraffin wax to reduce the moisture content within chamber 22 and further provide for even burning of container 12. The paraffin wax coating may also be treated with a mixture of potassium chlorate to facilitate heat generation and combustion of the charcoal fuel particles 14. Vent holes 24 in cap 20 provide a convenient carrying handle in addition to enhancing air flow within chamber 22 for combustion. In an alternative embodiment, cap 20 may be removed by tear open strip 28 to permit access to charcoal fuel particles 14.

The foregoing detailed description is to be clearly understood as being given as way of illustration and example only, the spirit and scope of the present invention being limited solely by the appended claims.

What is claimed is:
1. A combustible fuel apparatus, comprising:
   side walls formed contiguous with and extending generally upward from a base and converging to form a closed container, having stacked charcoal fuel particles therein arranged to conform to the interior dimensions of said container including said base, wherein said base may be placed directly on a substantially horizontal surface and said container may be ignited and substantially burned to ash, and said charcoal fuel particles may be ignited and sufficiently burned for cooking, wherein said charcoal fuel particles are stacked on said base in a relatively stable position prior to the igniting of said container, and are maintained in a relatively stable position during and after the igniting and burning of said container, whereby a mound of ignited charcoal fuel particles remains on said substantially horizontal surface after the burning of said container, said mound having a configuration substantially similar to the shape of said container prior to the combustion thereof.

2. The apparatus according to claim 1 wherein:
said charcoal fuel particles are treated with a flammable substance to enhance combustion.

3. The apparatus according to claim 1 wherein:
the interior surface area of said container is coated with paraffin wax.

4. The apparatus according to claim 1 wherein:
the interior surface area of said container is coated with a mixture of potassium chlorate.

5. The apparatus according to claim 1 wherein:
an upper portion of said container includes a plurality of apertures.

6. The apparatus according to claim 5 wherein:
said apertures comprise perforated flaps contiguous with said side walls which may be opened by applying force thereto.

7. The apparatus according to claim 1 wherein:
an upper portion of said container may be removed to permit access to said charcoal therein.

8. The apparatus to claim 1 wherein:
said container includes four side walls.

9. The apparatus according to claim 1 wherein:
said base in generally square in shape.

10. The apparatus according to claim 9 wherein:
said side walls are secured to said base at an angle of approximately forty-five degrees,
whereby six of said containers may be arranged to form a cube for packaging,
wherein each side wall of one of said containers is adjacent one side wall of each of four adjacent containers, and
the resulting cube contains substantially no voids between the side walls of said containers.

11. A combustible fuel apparatus, comprising:
a container having a lower base portion and side walls formed contiguous therewith which extend generally upward therefrom, said side walls converging to form an upper cap portion, wherein said container may be ignited to cause combustion of the contents therein;
wherein, said contents comprise charcoal fuel particles arranged in a generally overlying, stacked relationship to conform to the interior dimensions of said container including said lower base portion,
said charcoal fuel particles are stacked on said base in a relatively stable position when said base is substantially horizontal, and
said charcoal fuel particles are maintained in a relatively stable position during and after the igniting and burning of said container, whereby a mound of ignited charcoal fuel particles remains after the burning of said container, said mound having a configuration substantially similar to the shape of said container prior to the combustion thereof.

12. The apparatus according to claim 11 wherein:
said base is generaly square in shape.

13. The apparatus according to claim 12 wherein:
said side walls are secured to said base at an angle of approximately forty-five degrees,
whereby six of said containers may be arranged to form a cube for packaging,
wherein each side wall of one of said containers is adjacent with one side wall of each of four adjacent containers, and
the resulting cube contains substantially no voids between the side walls of said containers.

14. The apparatus according to claim 11 wherein:
said container includes a plurality of side walls.

15. The apparatus according to claim 11 wherein:
said cap includes vent means for facilitating air circulation to said charcoal fuel particles during combustion of said container.

16. The apparatus according to claim 14 wherein:
said vent means comprises flaps formed contiguous with said side walls which may be forced inward to form apertures.

17. The apparatus according to claim 11 wherein:
said upper cap portion may be removed to provide access to said contents.

18. The apparatus according to claim 11 wherein:
the interior surface area of said container is coated with paraffin.

19. The apparatus according to claim 11 wherein:
the interior surface area of said container is coated with a mixture of potassium chlorate.

20. A combustible fuel apparatus, comprising side walls formed contiguous with and extending generally upwardly from a base and converging to form a closed container, said closed container having stacked charcoal fuel particles therein arranged to conform to the interior dimensions of said container including said base, wherein said container is adapted to be ignited to cause combustion of said charcoal fuel particles,
an upper portion of said container has a plurality of apertures formed therein,
said charcoal fuel particles are stacked in a relatively stable position prior to igniting and are maintained in a stable position during and after the igniting and burning of said container,
whereby a mound of ignited charcoal fuel particles remains after the burning of said container, said mound of ignited charcoal fuel particles having a configuration substantially similar to the shape of said container prior to the combustion thereof, and
said charcoal fuel particles are treated with a flammable substance to enhance combustion,
whereby said charcoal fuel particles may be ignited to cause combustion for cooking without said container having been previously ignited.

21. The apparatus according to claim 20 wherein:
said closed container is generally pyramidal in shape.

* * * * *